United States Patent [19]
Ohashi

[11] Patent Number: 5,349,422
[45] Date of Patent: Sep. 20, 1994

[54] PRINTER FOR SCANNING ORIGINAL DOCUMENT AND COPY SHEET AND COMPUTING MAGNIFICATION RATIO

[75] Inventor: Yasuo Ohashi, Yokohama, Japan

[73] Assignee: Ricoh Company, Ltd., Tokyo, Japan

[21] Appl. No.: 112,324

[22] Filed: Aug. 27, 1993

[30] Foreign Application Priority Data

Sep. 1, 1992 [JP] Japan .................................. 4-233779
Jul. 22, 1993 [JP] Japan .................................. 5-181419

[51] Int. Cl.⁵ .......................................... G03G 15/04
[52] U.S. Cl. .................................... 355/243; 355/311
[58] Field of Search ............... 355/243, 55, 56, 311, 355/233, 313; 358/449

[56] References Cited

U.S. PATENT DOCUMENTS

| | | | |
|---|---|---|---|
| 4,947,206 | 8/1990 | Ito | 355/55 |
| 5,206,689 | 4/1993 | Kusuda | 355/243 |
| 5,237,379 | 8/1993 | Sklut et al. | 355/311 |

FOREIGN PATENT DOCUMENTS

| | | | |
|---|---|---|---|
| 0062271 | 5/1981 | Japan | 355/243 |
| 0147337 | 8/1984 | Japan | 355/243 |
| 0095367 | 5/1986 | Japan | 355/243 |
| 0223728 | 10/1986 | Japan | 355/243 |
| 0108079 | 4/1990 | Japan | 355/243 |

*Primary Examiner*—A. T. Grimley
*Assistant Examiner*—Robert Beatty
*Attorney, Agent, or Firm*—Oblon, Spivak, McClelland, Maier & Neustadt

[57] ABSTRACT

A printer having a digital image processing capability and capable of printing image data on a sheet of irregular size. The printer selects either a regular size sheet print mode or an irregular size sheet print mode. When the irregular size sheet print mode, the printer sequentially scans a sheet of irregular size and a document, calculates a magnification change ratio for the sheet on the basis of the resulting size data, and then prints the image data of the document on the sheet on the basis of the calculated magnification change ratio.

3 Claims, 3 Drawing Sheets

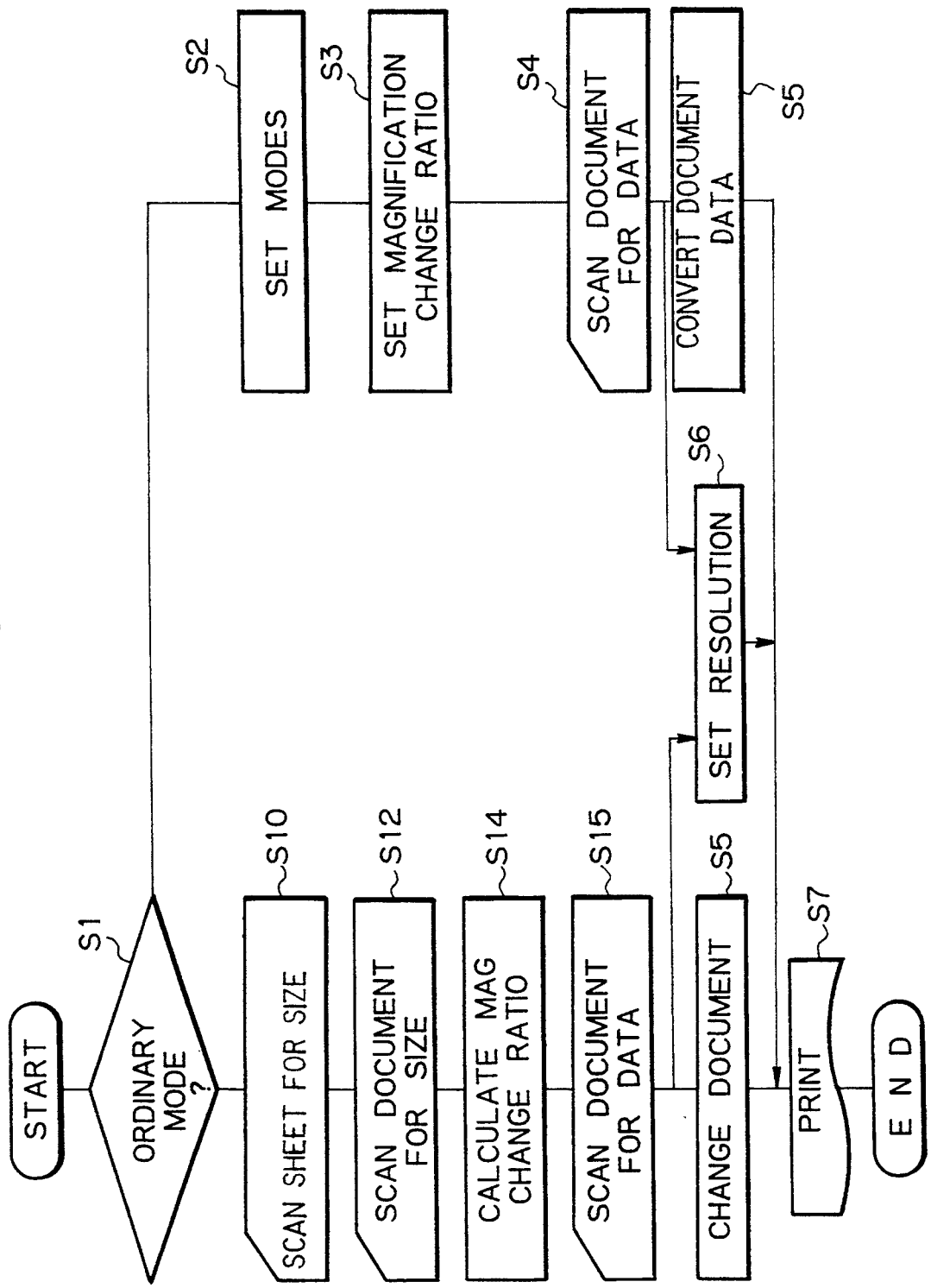

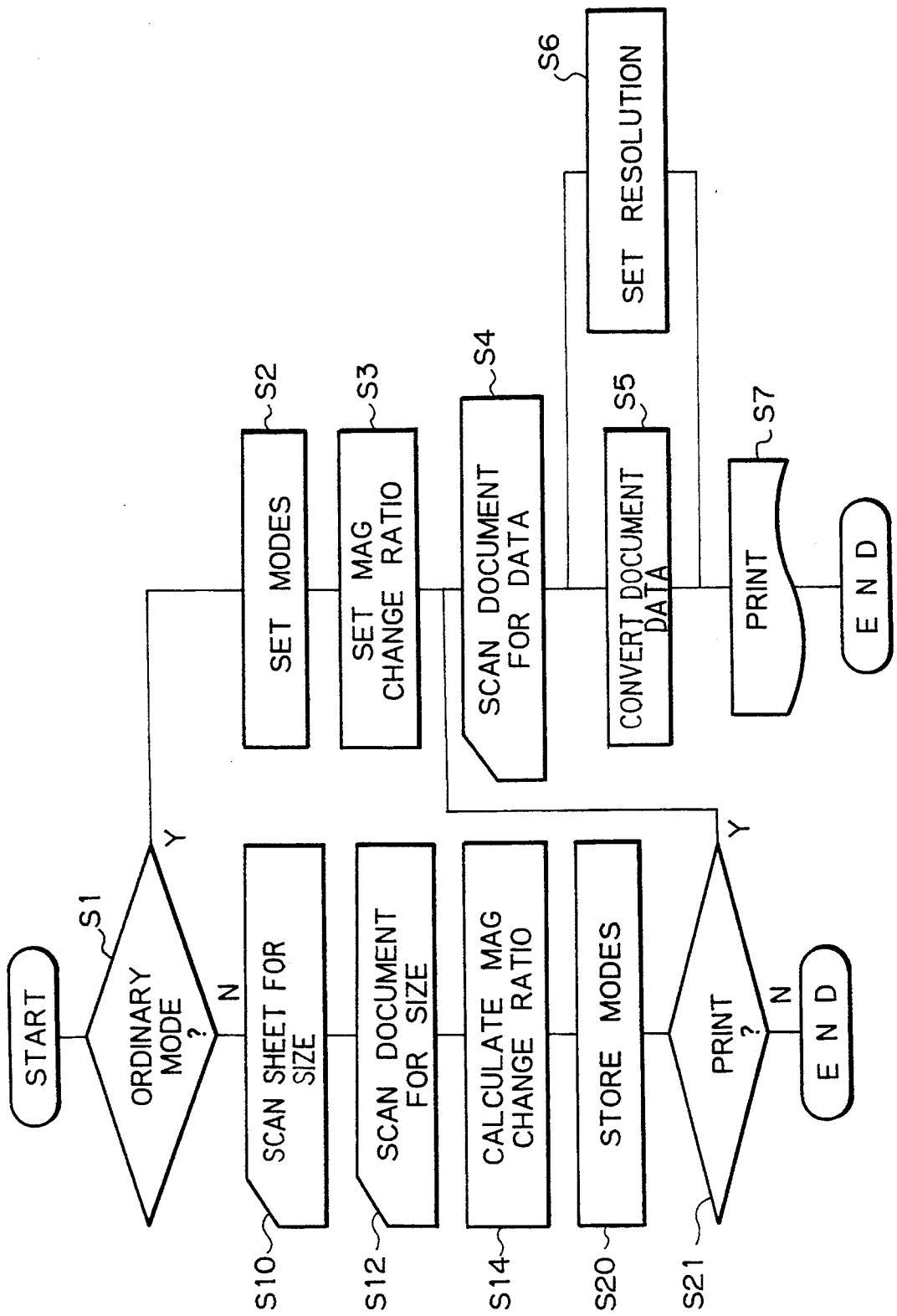

PRINTER FOR SCANNING ORIGINAL DOCUMENT AND COPY SHEET AND COMPUTING MAGNIFICATION RATIO

BACKGROUND OF THE INVENTION

The present invention relates to a printer having a digital image processing capability and, more particularly, to a printer capable of printing image data on a sheet of irregular size.

It is a common practice with a printer of the type described to provide keys on an operation panel which are accessible for printing image data on sheets of regular sizes (e.g. A4, A3, B5 and B4) by menu selection. However, when a sheet of irregular size is used, the size thereof cannot be defined. In practice, therefore, it is impossible to deal with, e.g., a magnification change ratio for a sheet of irregular size by menu selection. It has been customary with a printer to determine the size of sheets by use of exclusive sheet cassettes of different sizes or a slidable sheet feed tray. A sheet size sensor built in a tray is another conventional implementation. However, sheet sizes are not sensed on a millimeter basis since sheets of irregular sizes are not expected to be often used. It follows that the operator intending to use a sheet of irregular size has to measure or estimate the size of a document and that of the sheet and then operate, e.g., the keys to enter the dimensions of the sheet or an adequate magnification change ratio.

SUMMARY OF THE INVENTION

It is, therefore, an object of the present invention to provide a printer capable of scanning a sheet on a glass platen beforehand to determine the size thereof, calculating a longitudinal and a lateral magnification change ratio at the time of printing, and then producing a printing in the calculated magnification change ratio.

It is another object of the present invention to provide a printer capable of processing image data representative of a document on the basis of the background density and other information read out of a sheet by scanning.

It is another object of the present invention to provide a printer capable of storing the size, background density and other information read out of a sheet by scanning in a memory, and using the stored information in the future.

A printer capable of processing image data of the present invention comprises a mode selecting section for selecting either of a regular size sheet print mode for printing image data on a sheet of regular size and an irregular size sheet print mode for printing image data on a sheet of irregular size, a scanner for scanning, when the irregular size sheet print mode is selected, a sheet of irregular size and a document for recognizing information associated with the sheet of irregular size, a calculating section for calculating a magnification change ratio for the sheet of irregular size on the basis of, among the information produced by the scanner, size data, and a printing section for printing image data of the document on the basis of the magnification change ratio calculated by the calculating section.

BRIEF DESCRIPTION OF THE DRAWINGS

The above and other objects, features and advantages of the present invention will become more apparent from the following detailed description taken with the accompanying drawings in which:

FIG. 2 is a flowchart demonstrating the operation of a printer embodying the present invention; and FIG. 3 is a flowchart representative of an alternative embodiment of the present invention.

DESCRIPTION OF THE PREFERRED EMBODIMENTS

Figure 1:
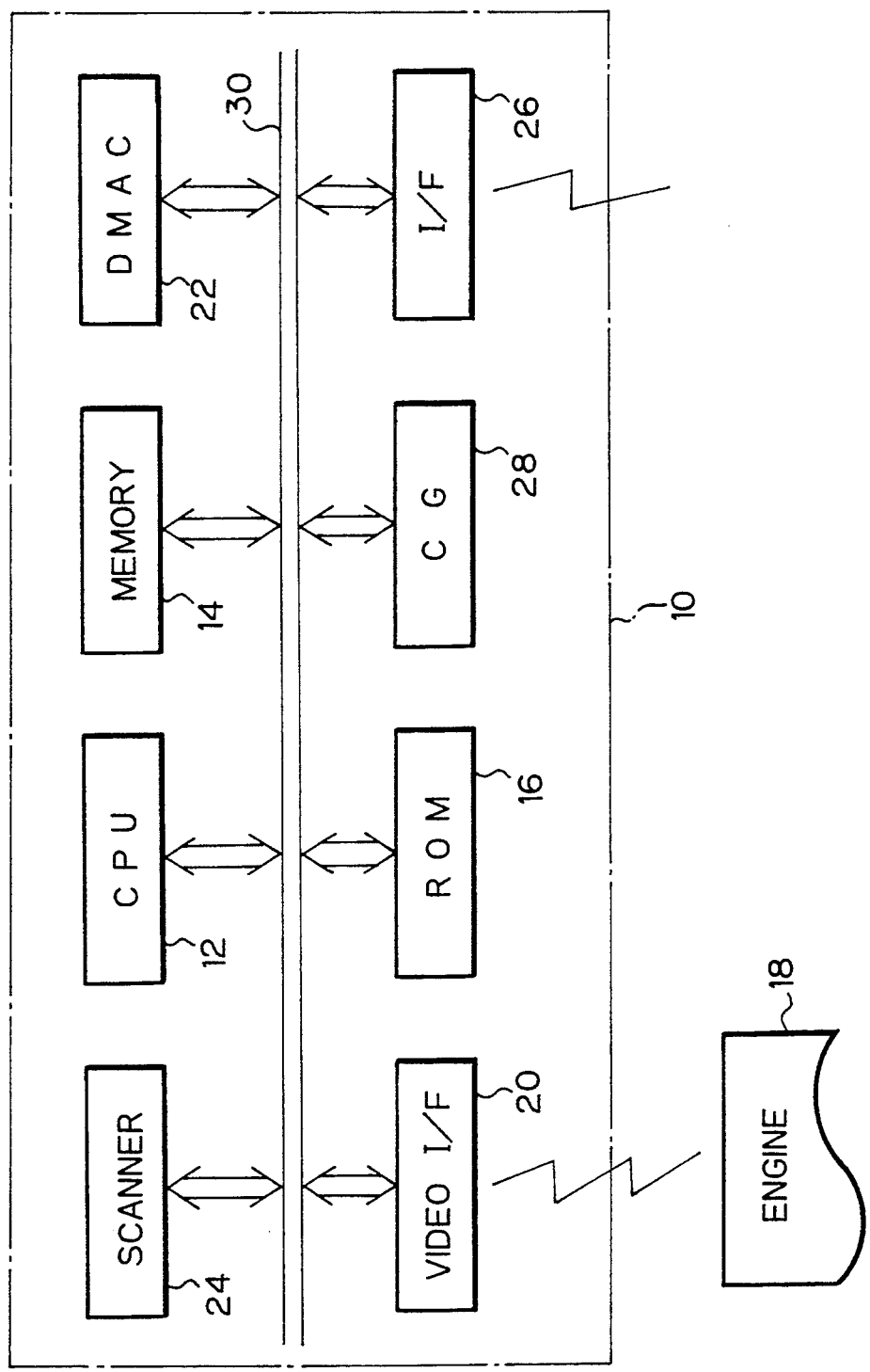
FIG. 1 is a block diagram schematically showing a controller built in a printer with which the present invention is practicable.

Referring to FIG. 1 of the drawings, there is shown a controller 10 incorporated in a digital printer with which the present invention is practicable. As shown, the controller 10 includes a CPU (Central Processing Unit) 12 governing the entire printer. A memory 14 is used as a work area for storing data to be processed. A ROM (Read Only Memory) 16 stores programs, data for setting modes, and so forth. A printer body, or engine as often referred to, 18 is connected to the controller 10. A video interface (I/F) 20 interfaces the controller 10 and engine 18. A DMAC (Direct Memory Access Controller) 22 is associated with the main memory 14. The reference numeral 24 designates a scanner. An interface (I/F) 26 is available for connecting an external system or equipment to the controller 10. Designated by the reference numeral 28 is a character generator (CG). These constituents of the controller 10 are connected together by a bus 30.

The operation of a printer embodying the present invention will be described with reference to FIG. 2. To begin with, whether or not the sheet for printing data is of regular size or of irregular size is determined (step S1). This decision may be done in response to an operator's input or automatically by the scanner 24. If the sheet is of regular size, it is determined that an ordinary print mode should be executed. Then, the ordinary print mode is set up (step S2), fixed magnification change ratios $\gamma x$ and $\gamma y$ are set up (step S3), and a document is scanned (step S4). The step S4 is followed by a step S5 for converting data read out of the document or by a step S6 for setting a particular resolution. Finally, the document data is printed on the sheet (step S7). The routine including the steps S2, S3, S4, S5 or S6, and S7 has been customary with printers in general.

When the sheet is of irregular size, the illustrative embodiment causes the scanner 24 to read the sheet size beforehand, store the sheet size, and automatically calculate a magnification change ratio when the scanner 24 reads a document. Specifically, when the sheet is of irregular size (No, step 1), the scanner 24 scans the sheet to determine and store the longitudinal and lateral dimensions Prt-x and Prt-y of the sheet (step S10). Subsequently, the scanner 24 scans a document to determine the longitudinal and lateral dimensions Org-x and Org-y of the document (step S12). Then, a longitudinal magnification change ratio $\delta x$ and a lateral magnification change ratio $\delta y$ are produced (step S14), as follows:

$$\delta x = Prt\text{-}x / Org\text{-}x$$

$$\delta y = Prt\text{-}y / Org\text{-}y$$

While the above equations produce the longitudinal and lateral magnification change ratios independently of each other, the results of such equations may be used to produce a magnification change ratio common to both of longitudinal and horizontal, as follows:

$$\delta = \delta x (\delta x \leqq \delta y)$$

or $$\delta = \delta y (\delta x > \delta y)$$

In a step S15, the scanner 24 again scans the document to store the resulting image data in the memory, or work area, 14.

To change the magnification of the image data on the memory 14, the data itself may be changed on the basis of the magnification change ratios determined by the above procedure (step S5), or the resolution may be changed (step S6). The data changing scheme divides the image data stored in the memory 14 into given blocks and executes predetermined magnification change processing (thinning or interpolation) block by block. As a result, 6×4 dots data, for example, are converted to 5×3 dots, 6×5 dots or similar data. Since this scheme adds, omits or otherwise manipulates part of the image data, it needs complicated and time-consuming internal processing. Moreover, this kind of scheme is apt to deform the image data when the data is printed on a sheet. On the other hand, the resolution changing scheme changes, when applied to a laser printer by way of example, the dot diameter itself by changing the turn-on and turn-off times of a laser beam, the rotation speed of a polygon mirror, the rotation speed of an image transfer drum, etc. Hence, the image data stored in the memory 14 is directly transferred to the engine 18 via the video I/F 20, while the magnification is changed by hardware when an image is to be formed on the transfer drum. The transfer of the image data from the memory 14 to the engine 18 occurs at extremely high speed and, therefore, reduces the processing time. In addition, the image is prevented from being toughened so long as it is not enlarged in an extraordinary magnification. It follows that the magnification change using resolution should preferably be used. The resulting image data is printed on the sheet in the step S7.

With the illustrative embodiment, it is also possible to read the background density and other information out of the sheet of irregular size by the scanner 24. For example, when the background color of the sheet of irregular size is higher in density than ordinary sheets, the printing density may be increased to produce a legible printing.

In the embodiment, it is assumed that the sheet of irregular size is fed from a slidable tray by hand. Alternatively, an exclusive cassette, for example, may be used when image data should be continuously printed on a great number of sheets of irregular size.

Further, a recording sheet may be read by an exclusive scanner independent of the scanner 34 provided on the copier body.

Referring to FIG. 3, a flowchart representative of an alternative embodiment of the printer in accordance with the present invention is shown. As shown, when the recording sheet is of irregular size as determined in the step S1, the steps S10, S12 and S14 are executed, as in the routine shown in FIG. 2. The step S14 is followed by a step S20 for storing the size of the sheet and various conditions associated therewith as print modes. The step S20 is followed by a step S21 for determining whether or not to print image data. Thereafter, the steps S4, S5 and S7 or the steps S4, S6 and S7 are executed to print the image data, as in the procedure of FIG. 2.

Since the sheet size and associated conditions are stored in the step S20, the sheet of irregular size can be dealt with in the same manner as a sheet of regular size afterwards. Specifically, when a sheet identical with the sheet of irregular size is used in the future, it can be coped with by menu selection, e.g., by pressing a mode key; once the sheet size and associated data are stored, modes can be entered on an operation panel immediately.

In a system having a floppy disk drive (FDD) or similar external storage, the stored sheet data can be shared by another system. For example, by causing a printer without a scanner to read the sheet data stored in a floppy disk and inputting document data to the printer via an external interhce, it is possible to print the document data on a sheet of irregular size in a changed magnification.

In summary, it will be seen that the present invention provides a printer which causes a scanner to read the size (longitudinal and lateral dimensions) of a sheet beforehand and, therefore, can print document data even on a sheet of irregular size by automatically calculating a magnification change ratio. Since the printer can process a document image by reading the background density of a sheet, a legible printing matching the background density of a sheet is achievable. Furthermore, the printer stores data associated with a sheet in a memory. Hence, when a sheet identical with the previous sheet of irregular size is used, adequate modes can be set up only if a menu is selected on an operation panel. This makes it needless to read the subsequent sheet or to enter the sheet size and magnification change ratio again on the operation board.

Various modifications will become possible for those skilled in the art after receiving the teachings of the present disclosure without departing from the scope thereof.

What is claimed is:

1. A printer capable of processing image data, comprising:

mode selecting means for selecting either of a regular size sheet print mode for printing image data on a sheet of regular size or an irregular size sheet print mode for printing image data on a sheet of irregular size;

scanner means for scanning, when said irregular size sheet print mode is selected, a sheet of irregular size and a document associated with said sheet of irregular size for determining a size of the sheet of irregular size and a size of the document;

calculating means for calculating a magnification change ratio for said sheet of irregular size on the basis of the determined size of the sheet of irregular size and the determined size of the document; and printing means for printing image data of said document on the basis of said magnification change ratio calculated by said calculating means.

2. A printer as claimed in claim 1, wherein the scanner means further determines a background density of the sheet of irregular size and said printing means prints the image data on the basis of the determined background density of said sheet of irregular size.

3. A printer as claimed in claim 1, further comprising storing means for storing said determined size of the sheet of irregular size produced by said scanner means so as to allow said sheet of irregular size to be handled as a sheet of regular size afterwards.

* * * * *